United States Patent
Gürsu et al.

(10) Patent No.: US 11,564,119 B2
(45) Date of Patent: Jan. 24, 2023

(54) CONDITIONAL PROACTIVE DISCONTINUOUS RECEPTION (DRX) MEASUREMENT

(71) Applicant: NOKIA TECHNOLOGIES OY, Espoo (FI)

(72) Inventors: Halit Murat Gürsu, Munich (DE); Ahmad Awada, Munich (DE); Ingo Viering, Munich (DE); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 50 days.

(21) Appl. No.: 17/204,498

(22) Filed: Mar. 17, 2021

(65) Prior Publication Data

US 2022/0303806 A1 Sep. 22, 2022

(51) Int. Cl.
  *H04W 24/10* (2009.01)
  *H04W 76/19* (2018.01)
  *H04B 7/08* (2006.01)
  *H04W 76/28* (2018.01)

(52) U.S. Cl.
  CPC ............. *H04W 24/10* (2013.01); *H04B 7/088* (2013.01); *H04W 76/19* (2018.02); *H04W 76/28* (2018.02)

(58) Field of Classification Search
  CPC ..... H04W 24/10; H04W 76/19; H04W 76/28; H04B 7/088
  See application file for complete search history.

(56) References Cited

U.S. PATENT DOCUMENTS

2022/0007286 A1* 1/2022 Ciftcioglu ......... H04W 36/0088

OTHER PUBLICATIONS

3GPP TS 22.104 V16.5.0 (Jul. 2020), Technical Specification, 3rd Generation Partnership Project; Technical Specification Group Services and System Aspects; Service requirements for cyber-physical control applications in vertical domains; Stage 1 (Release 16), Jul. 2020.
3GPP TS 22.104 V17.4.0 (Sep. 2020), Technical Specification, 3rd Generation Partnership Project; Technical Specification Group Services and System Aspects; Service requirements for cyber-physical control applications in vertical domains; Stage 1 (Release 17), Sep. 2020.

(Continued)

*Primary Examiner* — Chuong A Ngo
(74) *Attorney, Agent, or Firm* — Squire Patton Boggs (US) LLP

(57) ABSTRACT

Systems, methods, apparatuses, and computer program products for conditional proactive discontinuous reception (DRX) measurement are provided. For example, a user equipment (UE) may be in a DRX active state (e.g., where the DRX is used) and configured to proactively measure for radio problems. Another example may relate to a network-controlled implementation where the serving network node (e.g., a base station (BS)) may signal the UE a condition and a configuration for the proactive DRX measurement. Another example may relate to a UE-controlled implementation for improving service unavailability using DRX operation. For example, the serving BS may signal, to the UE, proactive DRX measurement assistance information.

20 Claims, 8 Drawing Sheets

(56) References Cited

OTHER PUBLICATIONS

3GPP TR 38.875 V2.0.0 (Mar. 2021), Technical Report, 3rd Generation Partnership Project; Technical Specification Group Radio Access Network; Study on support of reduced capability NR devices (Release 17), Mar. 2021.
3GPP TS 23.203 V16.2.0 (Dec. 2019), Technical Specification, 3rd Generation Partnership Project; Technical Specification Group Services and System Aspects; Policy and charging control architecture (Release 16), Dec. 2019.
3GPP TS 38.133 V15.12.0 (Dec. 2020), Technical Specification, 3rd Generation Partnership Project; Technical Specification Group Radio Access Network; NR; Requirements for support of radio resource management (Release 15), Dec. 2020.
3GPP TS 38.133 V16.6.0 (Dec. 2020), Technical Specification, 3rd Generation Partnership Project; Technical Specification Group Radio Access Network; NR; Requirements for support of radio resource management (Release 16), Dec. 2020.
3GPP TS 38.133 V17.0.0 (Dec. 2020), Technical Specification, 3rd Generation Partnership Project; Technical Specification Group Radio Access Network; NR; Requirements for support of radio resource management (Release 17), Dec. 2020.
ZTE Corporation, Summary of Offline [110][REDCAP]—RRM Relaxations, 3GPP R2-2102038, 3GPP TSG-RAN WG2 Meeting #113e, Electronic Meeting, Jan. 25-Feb. 5, 2021.

* cited by examiner

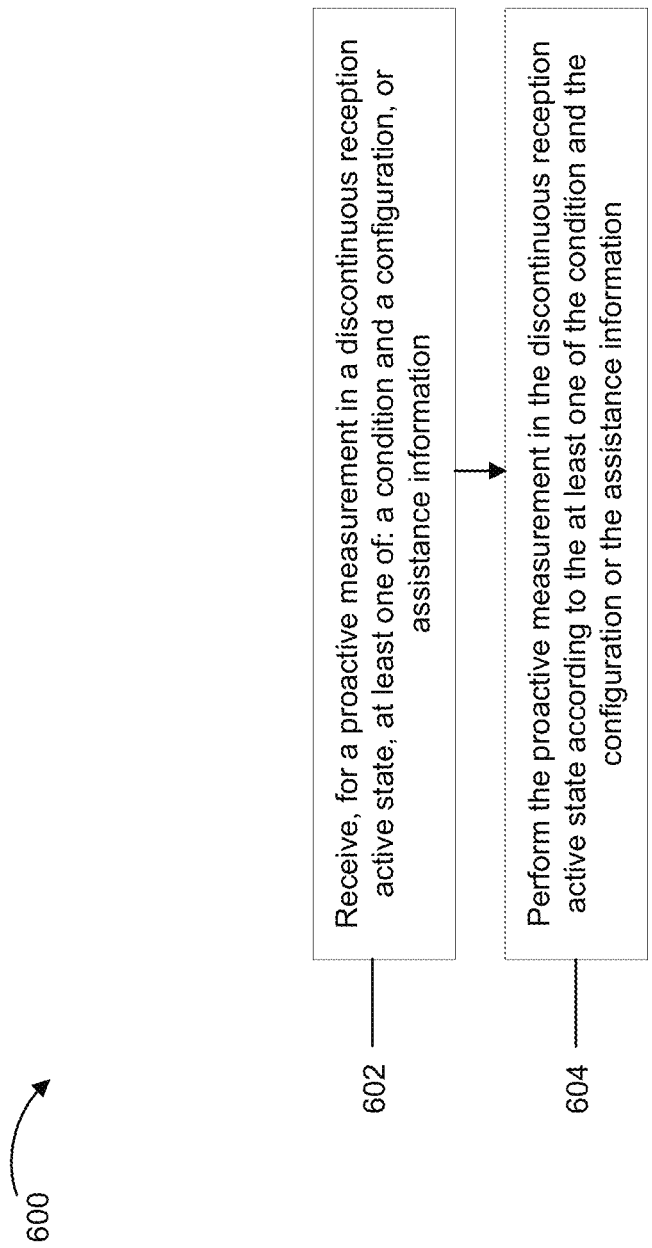

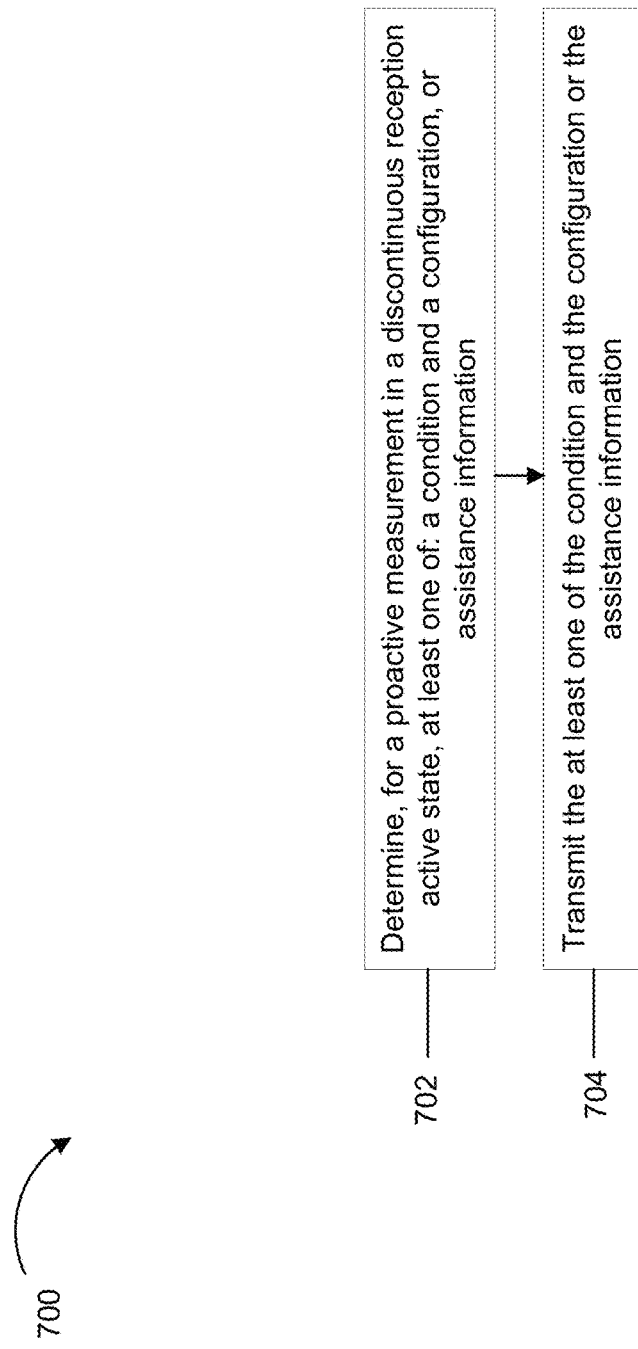

CONDITIONAL PROACTIVE DISCONTINUOUS RECEPTION (DRX) MEASUREMENT

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for conditional proactive discontinuous reception (DRX) measurement.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include receiving, for a proactive measurement in a discontinuous reception active state, at least one of: a condition and a configuration, or assistance information. The method may include performing the proactive measurement in the discontinuous reception active state according to the at least one of the condition and the configuration or the assistance information. The proactive measurement may be used to maintain a quality of a radio link in the discontinuous reception active state.

In a variant, the performing may include performing the proactive measurement more frequently than allowed by the discontinuous reception active state. In a variant, the receiving may include receiving the condition in signaling that includes at least one of: a beam or cell measurement parameter of a radio bearer, or a quality of service parameter of the radio bearer. In a variant, the receiving may include receiving the configuration in signaling that includes at least one of: a beam failure indication evaluation, or an out-of-sync evaluation. In a variant, the performing may include determining that the condition is satisfied, and applying the configuration based on the condition.

In a variant, the method may further include transmitting, to a network node, information related to the proactive measurement. In a variant, the information may include at least one of: a duration of a recovery of the radio link, a number of times the condition has been satisfied, or whether a radio problem is detected after the condition is satisfied. In a variant, the assistance information may include at least one of: an expected duration of one or more recovery procedures of the radio link, or a likelihood of the one or more recovery procedures of the radio link occurring before a next discontinuous reception active time. In a variant, the one or more recovery procedures may include at least one of: a beam failure recovery, a cell re-selection, or a handover. In a variant, the method may further include detecting a potential failure of the radio link, and initiating a recovery of the radio link.

In a variant, the condition may include at least one of: a reference signal received power associated with a serving cell, a reference signal received power associated with a serving beam, one or more quality of service requirements, an amount of time since downlink data was last received, or an amount of time since generation of the downlink data. In a variant, the configuration may include at least one of: a time based on a user equipment discontinuous reception timer for performing the proactive measurement, or a type of the proactive measurement. In a variant, the type may include at least one of: a beam failure indication evaluation or an out-of-sync evaluation.

According to a second embodiment, a method may include determining, for a proactive measurement in a discontinuous reception active state, at least one of: a condition and a configuration, or assistance information. In a variant, the method may further include transmitting the at least one of the condition and the configuration or the assistance information. The proactive measurement may be used to maintain a quality of a radio link in the discontinuous reception active state.

In a variant, the transmitting may include transmitting the condition in signaling comprising at least one of: a beam or cell measurement parameter of a radio bearer, or a quality of service parameter of the radio bearer. In a variant, the transmitting may include transmitting the configuration in signaling that includes at least one of: a beam failure indication evaluation, or an out-of-sync evaluation. In a variant, the method may further include receiving, from a user equipment, information related to the proactive measurement. In a variant, the information may include at least one of: a duration of a recovery of the radio link, a number of times the condition has been satisfied, or whether a radio problem is detected after the condition is satisfied.

In a variant, the assistance information may include at least one of: an expected duration of one or more recovery procedures of the radio link, or a likelihood of the one or more recovery procedures of the radio link occurring before a next discontinuous reception active time. In a variant, the one or more recovery procedures may include at least one of: a beam failure recovery, a cell re-selection, or a handover. In a variant, the condition may include at least one of: a reference signal received power associated with a serving cell, a reference signal received power associated with a serving beam, one or more quality of service requirements, an amount of time since downlink data was last received, or an amount of time since generation of the downlink data. In a variant, the configuration may include at least one of: a time based on a user equipment discontinuous reception timer for performing the proactive measurement, or a type of the proactive measurement. In a variant, the type may include at least one of: a beam failure indication evaluation or an out-of-sync evaluation.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to cause the apparatus to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein:

FIG. 6 illustrates an example flow diagram of a method, according to some embodiments;

FIG. 7 illustrates an example flow diagram of a method, according to some embodiments;

DETAILED DESCRIPTION

Figure 1:
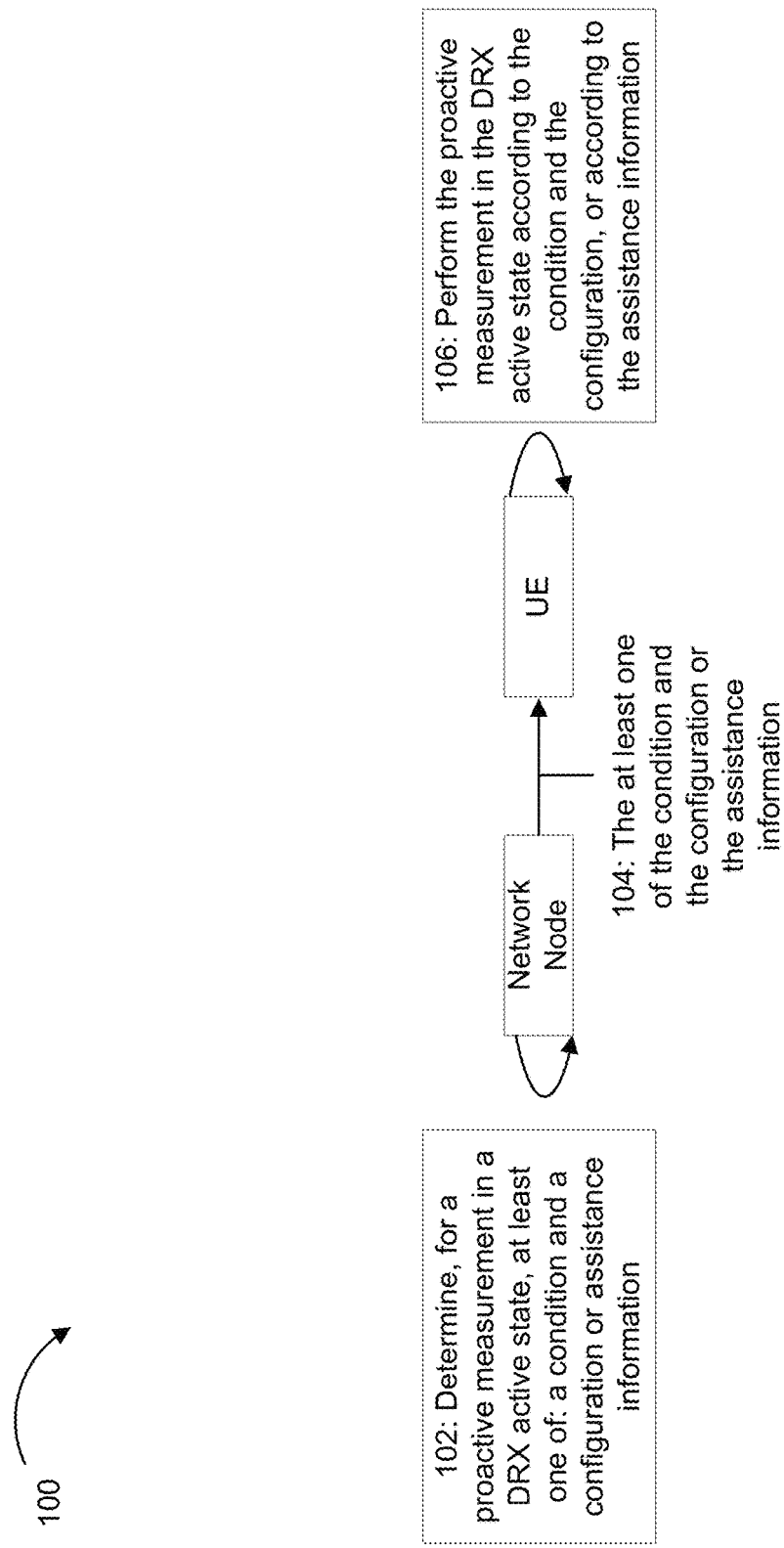
FIG. 1 illustrates an example of conditional proactive DRX measurement, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for conditional proactive DRX measurement is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

NR-light devices may be expected to make use of DRX to save energy as they may have to have several years of battery life. At the same time, some of the NR-light devices may have to operate according to certain latency parameters with service availability. NR may define, among other parameters, the UE's minimum parameters for measurements when the UE is in a DRX active state (e.g., a state when DRX is being used). For instance, NR may define the minimum parameters for a measurement evaluation period for link recovery (e.g., beam failure detection) and/or for cell level link quality evaluation (e.g., radio link maintenance (RLM)), and related indications to layer 3 (L3) may be defined.

When DRX is used, the minimum time between two measurements for the indication interval ($T_{indication\_interval}$) and for the beam failure detection (BFD) indication interval ($T_{indication\_interval\_BFD}$) may depend on the configured DRX cycle length (e.g., 1 or 1.5 times the DRX cycle length). The DRX cycle may control the UE's physical downlink control channel (PDCCH) monitoring behavior. For example, the UE may monitor the PDCCH in an onDuration when DRX is used. When the serving cell wants to schedule downlink (DL) data for the UE, it may send a message in PDCCH informing the UE about the physical downlink shared channel (PDSCH) resources where the data may be transmitted. At each DRX cycle, the UE may perform blind decoding of PDCCH. If the UE cannot detect any data, it may return to a sleep state. If the UE decodes the PDCCH, the UE may enter a state where the DRX is not used. In NR, the UE may be in a state where DRX is used during onDuration. As such, if no PDCCH is decoded, the UE may perform measurements as described above during a DRX cycle.

In some scenarios, there may be service unavailability when the UE is configured with DRX. For example, the DL data may arrive at the end of the onDuration. In this case, a radio problem may occur and the UE may not decode the packet. For this scenario, the UE may be configured with a DRX cycle greater than 320 milliseconds (ms), and the UE may perform measurements aligned with DRX, and a DL packet for the UE may arrive at the end of the onDuration. The next measurement cannot take place for a DRX cycle length that has passed, and the UE may not be able to detect the radio problem until the next measurement is performed. This may result in service unavailability, which may have a duration (T_unavail) according to the following equation:

$$T\_unavail = x*y*DRX\_cycle\_length - onDuration + T\_rec$$

where y may be set to 1 if the DRX duration is configured larger than 320 ms and to 1.5 if the DRX duration is configured smaller than 320 ms (and DRX is in use). The parameter x may be set to a number of measurements performed by the UE to declare radio problems, the parameter onDuration may be part of the DRX configuration of the UE, and the parameter T_rec may represent the duration of the recovery procedure. T_rec may have a value between 1 ms and 1 second (s). The onDuration can be in the range of 1 ms to 1.2 s, and the DRX_cycle length can be set to a value in the range of 10 ms to 10.2 s. The service unavailability duration of the UE (T_unavail) may be as large as x*y*12 seconds, which may cause problems related to service availability, e.g., for NR-light use cases of industrial wireless sensor networks and/or video surveillance devices (which may have to have an availability of more than 99.9 percent (%)).

In this respect, NR may provide use-case specific parameters. For industrial wireless sensors, communication service availability may have to be at least 99.99% and end-to-end latency may have to be less than 100 ms. The reference bit rate may have to be less than 2 megabits per second (Mbps) (potentially asymmetric, e.g., for uplink (UL) heavy traffic) when the device is stationary, and the battery may have to last at least a few years. For safety related sensors, latency may have to be lower, e.g., 5-10 ms. For video surveillance, the reference economic video bitrate may have to be in the range of 2-4 Mbps, latency may have to be less than 500 ms, and reliability may have to be at least in the range of 99%-99.9%. High-end video for, e.g., farming may have a reference economic video bitrate in the range of 7.5-25 Mbps. For wearable devices, the reference bitrate for smart wearable applications may be in the range of 5-50 Mbps in DL and in the range of 2-5 Mbps in UL. The peak bit rate of the device may be higher, such as up to 150 Mbps for downlink and up to 50 Mbps for uplink. The battery life of the device may have to last multiple days (e.g., up to 1-2 weeks).

NR may include minimum parameters for layer 1 (L1) indication. When the radio link quality on the reference signal (RS) resources in set $\sqrt{q_0}$ is worse than $Q_{out\_LR}$, the L1 of the UE may send a beam failure instance indication to the higher layers. $Q_{out\_LR}$ may be a threshold and may be defined as a level at which the downlink radio level link of a given resource configuration on set $\sqrt{q_0}$ cannot be reliably received and can correspond to a $BLER_{out}$ (e.g., a 10% block error rate (BLER) of a PDCCH transmission). A layer 3 (L3) filter may be applied to the beam failure instance indications. The beam failure instance evaluation for the RS resources in set $\overline{q_0}$ may be performed. Two successive indications from L1 may be separated by at least an amount of time equal to $T_{Indication\_interval\_BFD}$. When DRX is not used, $T_{Indication\_interval\_BFD}$ may be determined according to the equation max(2 ms, $T_{SSB-RS,M}$) or max(2 ms, $T_{CSI-RS,M}$), where $T_{SSB-RS,M}$ and $T_{CSI-RS,M}$ are the shortest periodicity of RS resources in the set $\overline{q_0}$ for the accessed cell, corresponding to either the shortest periodicity of the synchronization signal block (SSB) in the set $\overline{q_0}$ or channel state information-reference signal (CSI-RS) resources in the set $\overline{q_0}$.

When DRX is used, for SSB-based link quality measurements, $T_{Indication\_interval\_BFD}$=Max(1.5×DRX_cycle_length, 1.5×$T_{SSB-RS,M}$) if DRX_cycle_length≤320 ms, or $T_{Indication\_interval\_BFD}$=DRX_cycle_length if DRX_cycle_length>320 ms. When DRX is used, for CSI-RS-based link quality measurements, $T_{Indication\_interval\_BFD}$=Max(1.5× DRX_cycle_length, 1.5×$T_{CSI-RS,M}$) if DRX_cycle_length≤320 ms, or $T_{Indication\_interval\_BFD}$= DRX_cycle_length if DRX_cycle_length>320 ms.

NR may provide minimum parameters for out-of-sync and in-sync operations. When the downlink radio link quality on the configured RLM-RS resources is worse than $Q_{out}$ (a threshold for out-of-sync evaluations), L1 of the UE may send an out-of-sync indication for the cell to the higher layers, and a L3 filter may be applied to the out-of-sync indications. When the downlink radio link quality on at least one of the configured RLM-RS resources is better than $Q_{out}$ (a threshold for in-sync evaluations), L1 of the UE may send an in-sync indication for the cell to the higher layers. A L3 filter may be applied to the in-sync indications, and the out-of-sync and in-sync evaluations for the configured RLM-RS resources may be performed. Two successive indications from L1 may be separated by at least an amount of time equal to $T_{Indication\_interval}$. When DRX is not used, $T_{Indication\_interval}$ may be determined based on the equation max(10 ms, $T_{RLM-RS,M}$), where $T_{RLM,M}$ may be the shortest periodicity of configured RLM-RS resources for the monitored cell, which may correspond to $T_{SSB}$ if the RLM-RS resource is SSB, or $T_{CSI-RS}$ if the RLM-RS resource is CSI-RS. In case DRX is used, $T_{Indication\_interval}$ may be based on the equation max(10 ms, 1.5×DRX_cycle_length, 1.5×$T_{RLM-RS,M}$) if the DRX cycle length is less than or equal to 320 ms, and $T_{Indication\_interval}$ may be equal to the DRX cycle length if the DRX cycle length is greater than 320 ms. Upon start of, e.g., a T310 timer, the UE may monitor the configured RLM-RS resources for recovery using the evaluation period and L1 indication interval corresponding to a mode where no DRX is used until the expiry or stop of T310 timer.

In addition, NR may include parameters for radio resource control (RRC) connected state in DRX. For instance, the UE may determine that no DRX is used when one or more of the following conditions are met: DRX parameters are not configured, DRX parameters are configured and a DRX inactivity timer (drx-InactivityTimer) is running, a DRX retransmission timer for DL (drx-RetransmissionTimerDL) is running, a DRX retransmission timer for UL (drx-RetransmissionTimerUL) is running, a random access contention resolution timer (ra-ContentionResolutionTimer) is running, a scheduling request sent on physical uplink control channel (PUCCH) is pending, and/or a PDCCH indicating a new transmission addressed to a cell radio network temporary identifier (C-RNTI) of a medium access control (MAC) entity has not been received after successful reception of a random access response for the preamble not selected by the MAC entity. Otherwise, the UE may determine that DRX is used.

A UE using DRX with an active time of less than or equal to 320 ms that performs measurements at the point of DL arrival may experience service unavailability. For example, the radio problem may occur until the next active time, and the UE may not decode the next packet. In this scenario, a measurement may be performed at the instance of DL data arrival. After the UE decodes the data and the inactivity timer (T_inact) expires, the UE may enter an inactive state. T_inact can be configured to be between, e.g., 0 ms and 2.5 seconds (based on an inactivity timer of 50 ms). During T_inact, the UE may be in a state where DRX is not used, and the measurements may be carried out frequently (e.g., every 20 ms), and the radio problem may occur during the inactive state. However, as the UE may enter DRX before any radio problem is declared, the UE can detect this problem, but may declare the radio problem after 1.5 times the length of the DRX cycle after the last measurement. Assuming the next data arrives a DRX cycle length (DRX_cycle_length) amount of time after the first data, the UE may experience a service unavailability (T_unavail) based on the equation T_unavail=0.5×DRX_cycle_length+T_inact+T_rec. Such service unavailability may be up to 260 ms. As can be understood from this, there may be a need to improve the service unavailability of devices using DRX without negatively impacting the energy saving aspects of DRX.

Some embodiments described herein may provide for conditional proactive DRX measurement. For example, according to some embodiments, a UE, which may be in a DRX active state (e.g., where the DRX is used), can be configured to perform a proactive measurement for radio problems. A proactive measurement may refer to performing a measurement more frequently than otherwise allowed in a DRX active state. Certain embodiments may relate to a network-controlled implementation where the serving network node (e.g., a base station (BS)) may signal the UE a condition and a configuration for the proactive DRX measurement. The condition may include, e.g., using a beam and/or cell measurement or quality of service (QoS) parameter of the UE radio bearers. For example, the condition may include whether a serving beam measurement (e.g., performed for the configured RLM resources) is below a threshold. The configuration may include, e.g., a beam failure indication evaluation or a QoS evaluation. For example, the configuration may include controlling the UE so that the UE performs a specific beam measurement X seconds before the DRX active time. If the condition is satisfied, the UE may perform the proactive DRX measurement with respect to the proactive DRX measurement configuration. For example, in a case where a radio problem is detected based on the proactive DRX measurement, the UE may initiate and perform a beam recovery procedure, which may be performed before the possible arrival time of DL scheduling.

The proactive DRX measurement conditions and/or configurations may be modified based on a proactive DRX measurement report from the UE. For example, the report may include the number of times the proactive DRX measurement has been triggered (or used) by the UE, a number of times a radio link problem or failure has been declared based on using proactive DRX measurements, a number of times a radio link problem is detected after the proactive DRX measurement condition is satisfied (e.g., for improvement of the proactive DRX measurement condition), the duration of a beam failure recovery (e.g., for improvement of the proactive DRX measurement configuration), and/or the duration of the radio resource control (RRC) reestablishment (e.g., for improvement of the proactive DRX measurement configuration).

Certain embodiments may relate to a UE-controlled implementation for improving service unavailability using DRX operations. For example, the serving BS may signal, to the UE, proactive DRX measurement assistance information. The assistance information may include, e.g., a likelihood of a recovery procedure for the UE and/or an expected duration of a recovery procedure for the UE. The UE may set a proactive DRX measurement based on the assistance information. For example, if the UE is expecting a priority DL packet, the UE may expect the worst case scenario with respect to arrival of the packet, may determine the maximum expected duration of a recovery procedure (e.g., 1 second), and may set the proactive measurement 1 second before the onDuration based on the maximum expected duration of the recovery procedure. In another example, the UE may determine the most likely recovery time (e.g., 500 ms) and may set the proactive measurement 500 ms before the onDuration based on the most likely recovery time.

In this way, certain embodiments described herein may allow the UE in DRX mode to detect a problem proactively and may perform beam failure recovery quickly to avoid packet loss. For example, the UE may detect beam failure and may perform beam recovery before the next packet arrives in the next DRX active time. This conserves processing and/or network resources that would otherwise be consumed as a result of packet loss, as a result of trying to recover a lost packet, and/or the like. In addition, certain embodiments may use a condition for proactive measurements when needed, thereby maintaining the energy-saving characteristics of the DRX state.

FIG. 1 illustrates an example 100 of conditional proactive DRX measurement, according to some embodiments. As illustrated in FIG. 1, the example 100 includes a network node (e.g., a BS) and a UE. The UE may be operating in a DRX active state (e.g., a state where DRX is used).

As illustrated at 102, the network node may determine, for a proactive measurement in a DRX active state, at least one of a condition and a configuration or assistance information. For example, the network node may determine a condition and a configuration and/or may determine assistance information. In certain embodiments, the condition may control if or when the UE performs the proactive measurement (e.g., may trigger the UE to perform the proactive measurement based on the condition being satisfied), and the configuration may control how the UE performs the proactive measurement (e.g., may provide parameters for performing the proactive measurement). As specific examples, a condition may include whether the value of a serving beam measurement satisfies a threshold and a configuration may include causing the UE to perform a proactive beam measurement X seconds before the DRX active time. The assistance information may include parameters, such as a likelihood of specific recovery procedures (e.g., beam failure recovery or handover) and an expected duration of those recovery procedures, that the UE may take into consideration when determining when or how to perform the proactive measurement. Using this information, the UE may determine when to perform a proactive measurement to try to guarantee a reliable link performance during DRX active time.

As illustrated at 104, the network node may transmit, to the UE, the at least one of the condition and configuration, or the assistance information. For example, the network node may transmit the condition and configuration and/or may transmit the assistance information depending on what the network node determined at 102. As illustrated at 106, the UE may perform the proactive measurement in the DRX active state according to the condition and the configuration or according to the assistance information. For example, depending on what the network node transmitted to the UE at 104, the UE may perform the proactive DRX measurement according to the condition and the configuration and/or may perform the proactive measurement according to the assistance information. The UE may perform the proactive measurement according to the condition and configuration by using the condition to determine when to perform the proactive measurement and then using the configuration to determine when to perform the proactive measurement. Additionally, or alternatively, the UE may perform the proactive measurement according to the assistance information by using the assistance information to more accurately determine when or how to perform the proactive measurement based on, e.g., the likelihood of a recovery procedure and/or an expected duration of the recovery procedure. In some embodiments, the UE may transmit a report or results of the proactive measurement to the network node.

These and other aspects of certain embodiments are described elsewhere herein. As described above, FIG. 1 is provided as an example. Other examples are possible, according to some embodiments.

Figure 2:
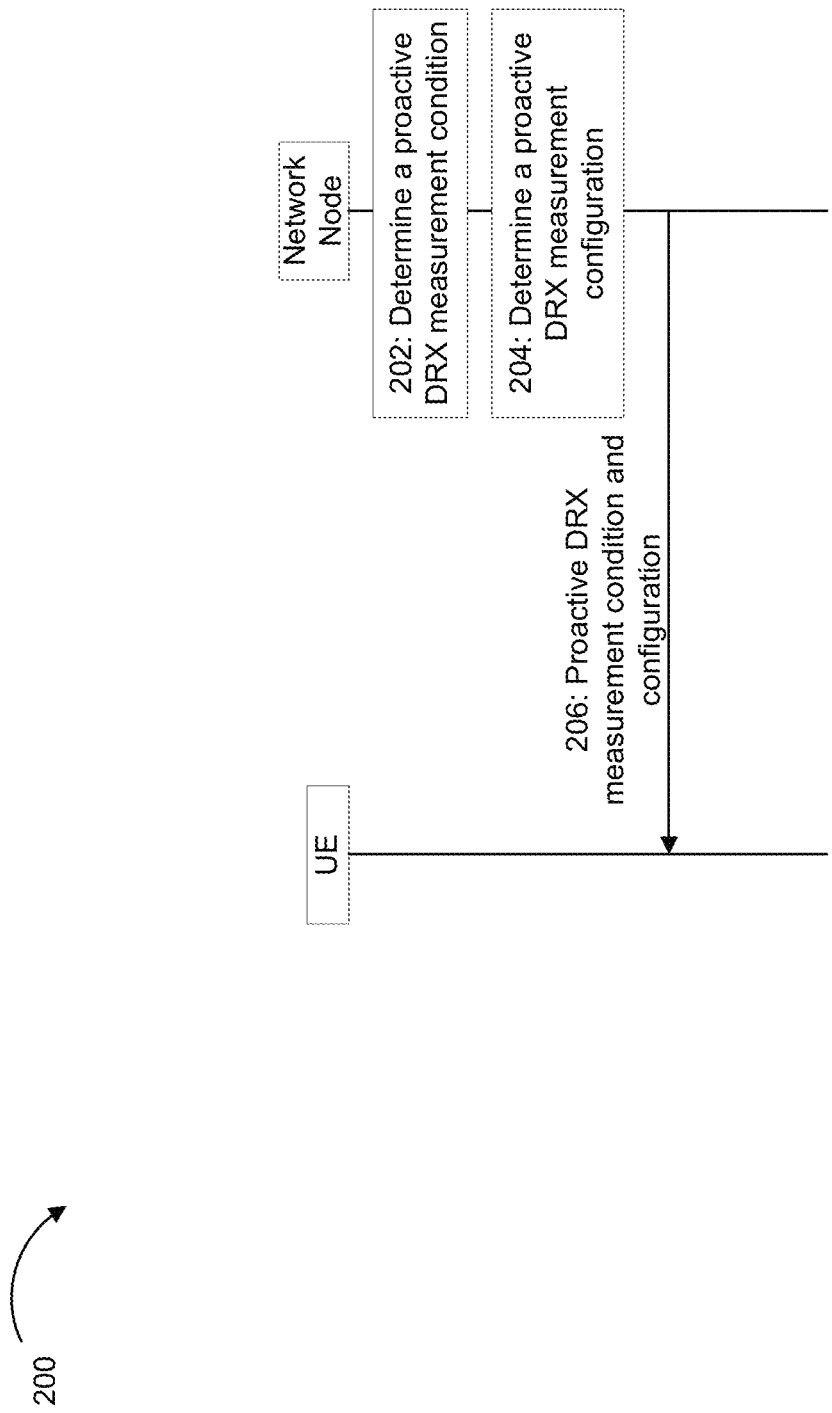
FIG. 2 illustrates an example signal diagram for a source cell determination of a condition and configuration for a proactive DRX measurement, according to some embodiments.

FIG. 2 illustrates an example signal diagram 200 of a source cell determination of a condition and configuration for a proactive DRX measurement (e.g., for a network-controlled implementation), according to some embodiments. As illustrated in FIG. 2, the signal diagram 200 includes a UE and a network node (e.g., a BS).

As illustrated at 202, the network node may determine a proactive DRX measurement condition. For example, the condition may be based on a layer 3 (L3) reference signal received power (RSRP) of a serving cell (e.g., whether the L3 RSRP is less than, or less than or equal to, a threshold). For example, this condition may indicate that the UE may experience a $Q_{out}$ or an out-of-service (OoS) event within a certain amount of time, may be used to configure a proactive OoS evaluation, and/or the like. Additionally, or alternatively, the condition may be based on a layer 1 (L1) RSRP of a serving beam of a serving cell (e.g., where the L1 RSRP is less than, or less than or equal to, a threshold). For example, this condition may indicate that the UE may experience a beam failure indication (BFI) within a certain amount of time. Additionally, or alternatively, the condition may be based on QoS parameters. For example, this condition may be based on a packet error rate (PER) not matching the PER of a QoS class indication (QCI) (e.g., the average PER for the last X packets is greater than, or greater than or equal to, a threshold percentage). The PER values may be translated to a block error rate (BLER) value. As other examples, this condition may indicate that higher layers (e.g., service data application protocol (SDAP), application function, etc.) cannot tolerate any more PER, can be used to configure both proactive OoS and BFI evaluation, and/or the like. Additionally, or alternatively, the condition may be based on an age of the last DL data. For example, in case the UE has recent DL data, failing to receive the next packet may not be problematic. However, if it has been more than a threshold amount of time since the UE received any DL data, it may be problematic if the UE does not receive the next packet.

As illustrated at 204, the network node may determine a proactive DRX measurement configuration. For example, the configuration may include a time to perform the proactive DRX measurement. In certain embodiments, the time may depend on a recovery procedure. For example, it may take between 1 ms and 1 s to perform a beam failure recovery, between 100 s and 1 s to perform RRC re-establishment, etc., and the configuration may cause the UE to complete the recovery procedure before arrival of the next DL data. Additionally, or alternatively, the time may depend on the time of the scheduled DL data during the onDuration. For example, if the DL data is to be scheduled at the end of the onDuration, the proactive measurement may be aligned to the DL data arrival instead of the start of the onDuration. Additionally, or alternatively, the configuration may include a type of proactive DRX measurement, e.g., a BFI evaluation and/or an OoS evaluation. For example, the UE may be configured to initiate a BFI evaluation 1 s before the next active time because the UE may expect the BFR to need 1 s at most to be performed, and the UE may be ready to receive the next DL packet during the onDuration.

As illustrated at 206, the network node may transmit, to the UE, the proactive DRX measurement condition and configuration determined at 202 and 204, respectively. For example, the network node may transmit the configurations in an optional container in a DRX configuration in the MAC-CellGropuConfig parameter in the RRC configuration.

As indicated above, FIG. 2 is provided as an example. Other examples are possible, according to some embodiments.

Figure 3:
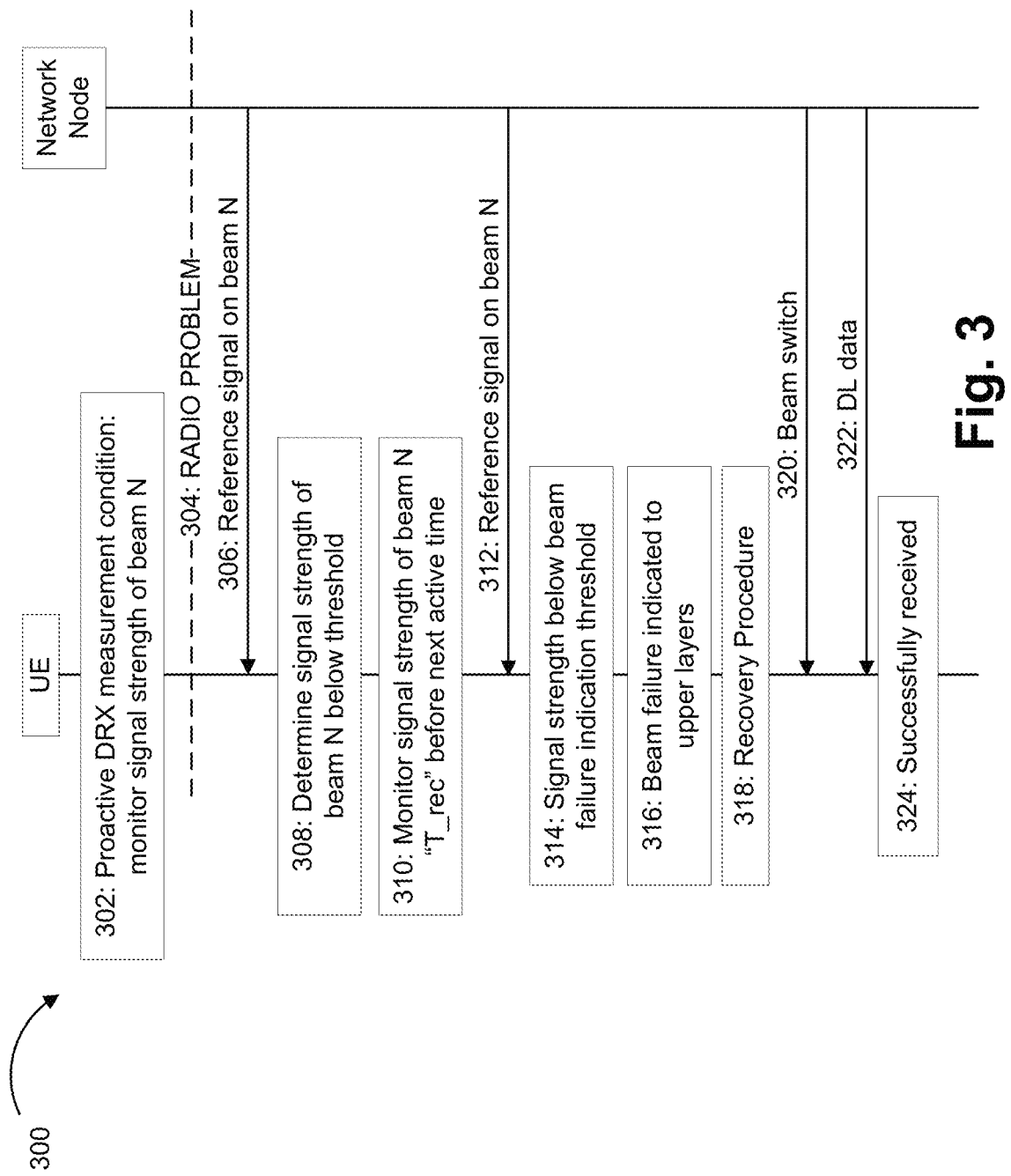
FIG. 3 illustrates an example signal diagram for triggering of a proactive DRX measurement based on a measurement condition, according to some embodiments.

FIG. 3 illustrates an example signal diagram 300 for triggering of a proactive DRX measurement based on a measurement condition (e.g., for the network node-controlled implementation), according to some embodiments. As illustrated in FIG. 3, the signal diagram 300 includes a UE and network node (e.g., a BS).

As illustrated at 302, the UE may operate according to a proactive DRX measurement condition. For example, the UE may monitor signal strength of a beam (e.g., beam N). As illustrated at 304, a radio problem may occur with respect to communications between the UE and the network node. As illustrated at 306, the network node may transmit a reference signal on beam N. As illustrated at 308, the UE may determine that the signal strength of beam N is below a threshold according to the condition. As illustrated at 310, the UE may monitor the signal strength of beam N "T_rec" seconds before the next DRX active time.

As illustrated at 312, the network node may transmit a reference signal on beam N. As illustrated at 314, the UE may determine that the signal strength of the reference signal on beam N is below a beam failure indication threshold. For example, the UE may detect a potential beam failure instance and may determine to initiate a related recovery procedure. As illustrated at 316, the UE may indicate the beam failure to upper layers (e.g., from L1 to L3, from physical (PHY) and/or medium access control (MAC) to radio resource control (RRC), etc.). As illustrated at 318, the UE may perform a recovery procedure. For example, the UE may perform a beam failure recovery, an RRC re-establishment procedure, and/or the like. The UE may complete the recovery procedure before the next DRX active time. As illustrated at 320, the network node may transmit a beam switch indication to the UE, and may transmit DL data to the UE at 322. As illustrated at 324, the UE may successfully receive the DL data based on completing the recovery procedure.

As described above, FIG. 3 is provided as an example. Other examples are possible, according to some embodiments.

Figure 4:
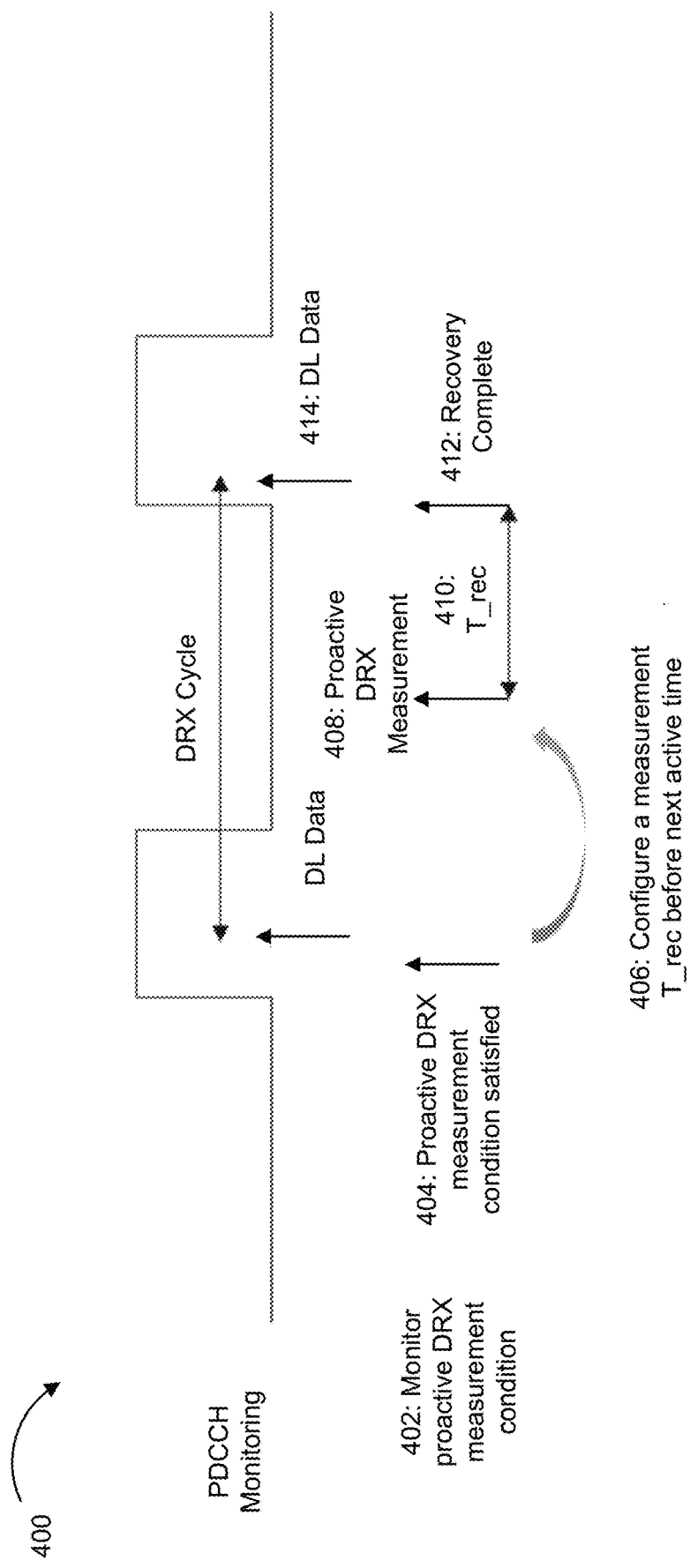
FIG. 4 illustrates an example of a proactive DRX measurement, according to some embodiments.

FIG. 4 illustrates an example 400 of a proactive DRX measurement (e.g., for the network-controlled implementation), according to some embodiments. For example, FIG. 4 may illustrate operations of a UE, such as PDCCH monitoring and a DRX cycle.

As illustrated at 402, the UE may monitor a proactive DRX measurement condition, and may determine that a proactive DRX measurement condition is satisfied at 404. As illustrated at 406, the UE may configure a measurement at least an amount of time equal to T_rec before the next active time. As illustrated at 408, the UE may perform the proactive DRX measurement. As illustrated at 410, the UE may perform the proactive DRX measurement at least an amount of time equal to T_rec before the next DRX cycle, and the recovery procedure may be complete at 412. As illustrated at 414, the UE may receive DL data during the DRX cycle. In this way, the condition may trigger the UE to perform a proactive DRX measurement an amount of time equal to T_rec before the next onDuration. In case a radio problem is detected, the UE may have enough time to recover to receive DL data without any delay.

As described above, FIG. 4 is provided as an example. Other examples are possible, according to some embodiments.

Figure 5:
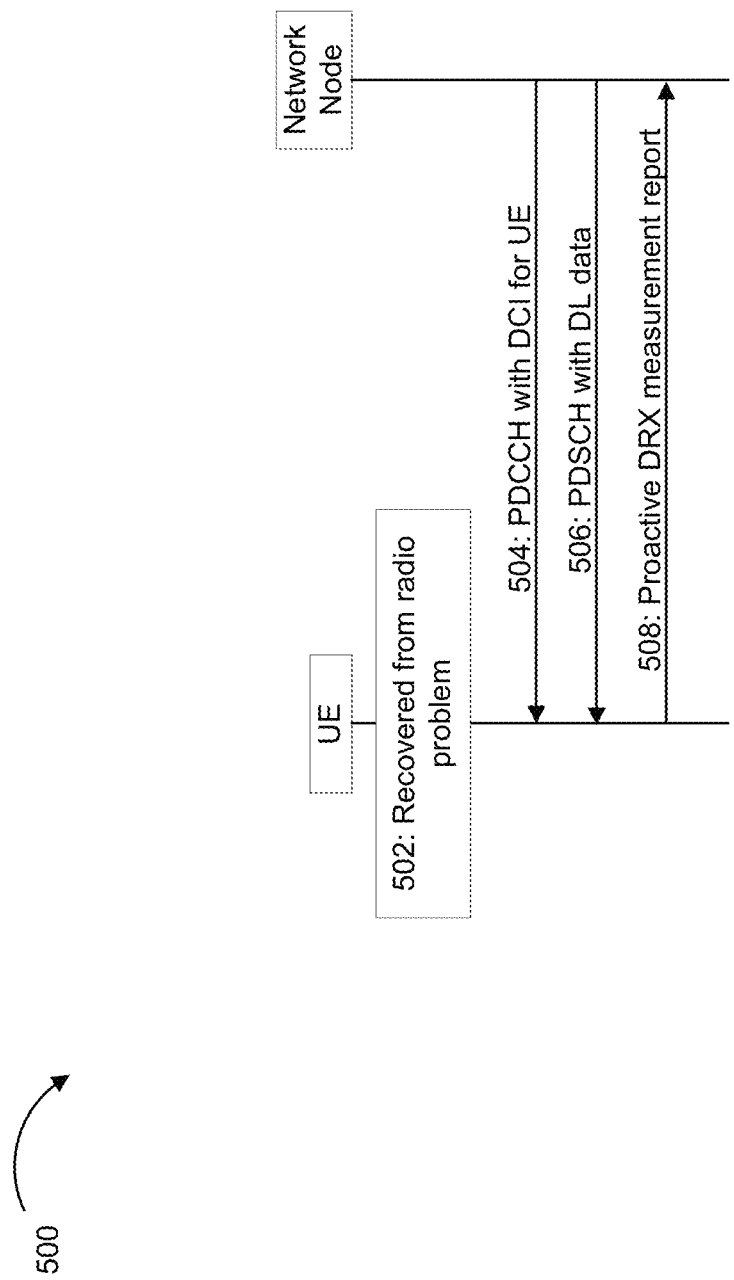
FIG. 5 illustrates an example signal diagram for a UE reporting parameters related to a proactive DRX measurement, according to some embodiments.

FIG. 5 illustrates an example signal diagram 500 of a UE reporting parameters related to a proactive DRX measurement (e.g., for a network-controlled implementation), according to some embodiments. As illustrated in FIG. 5, the signal diagram 500 includes a UE and a network node (e.g., a BS).

As illustrated at 502, the UE may have recovered from a radio problem, similar to that at 318 of FIG. 3. As illustrated at 504, the network node may transmit, to the UE, a PDCCH communication with downlink control information (DCI) for the UE, and may transmit, to the UE, a PDSCH communication with DL data at 506. As illustrated at 508, the UE may transmit, to the network node, a proactive DRX measurement report. For example, the report may include the number of times that a radio problem is detected after the proactive DRX measurement condition is satisfied. This may help to improve the network node's determination of the proactive DRX measurement condition by, e.g., indicating whether the radio problem is rarely detected so that the threshold can be increased or decreased accordingly. Additionally, or alternatively, the report may include a duration of a beam failure recovery procedure. This may help to improve the network node's determination of the proactive DRX measurement configuration by, e.g., indicating whether the duration of the BFR increases so that the BFI evaluation can be started earlier than previous evaluations. Additionally, or alternatively, the report may include a duration of the RRC re-establishment. This may help to improve the network node's determination of the proactive DRX measurement configuration by, e.g., indicating whether the duration of the RRC re-establishment increases so that the proactive OoS evaluation can be started earlier than previous evaluations.

As described above, FIG. 5 is provided as an example. Other examples are possible, according to some embodiments.

Although FIGS. 1-5 were described in the context of a network-controlled implementation, certain embodiments described herein may apply to a UE-controlled implementation. In the UE-controlled implementation, the serving network node (e.g., serving BS) may signal assistance information to the to the UE. The assistance information may include a likelihood of a recovery procedure for the UE (e.g., 5% beam switch, 9% smooth cell switch, 14% hard cell switch, etc.). Additionally, or alternatively, the assistance information may include an expected duration of a recovery procedure for the UE. For example, a beam switch may have a low recovery time, a smooth cell switch may have a medium recovery time, and a hard cell switch may have a high recovery time. As specific examples, a UE switch from beam 1 of a serving cell to beam 2 of the serving cell may take 20 ms, to beam 1 of a target cell A may take 50 ms, and to beam 1 of a target cell B may take 150 ms.

The UE may determine a proactive measurement based on the assistance information signaled by the BS. For example, if the UE is expecting a priority DL packet, then the UE may determine the worst case scenario for when the packet may arrive (e.g., early arrival), may determine the maximum expected duration of a recovery procedure (e.g., 1 s), and then may determine to perform the proactive measurement 1 s before the onDuration. As another example, the UE may determine the amount of time to be used for the most likely recovery procedure (e.g., the most likely recovery procedure may be a beam failure recovery with a duration of 500 ms), and may determine to perform the proactive measurement 500 ms before the onDuration.

FIG. 6 illustrates an example flow diagram of a method 600, according to some embodiments. For example, FIG. 6 may illustrate example operations of a UE (e.g., apparatus 20 illustrated in, and described with respect to, FIG. 4*b*). Some of the operations illustrated in FIG. 6 may be similar to some operations shown in, and described with respect to, FIGS. 1-5.

In an embodiment, the method 600 may include, at 602, receiving, for a proactive measurement in a discontinuous reception active state, at least one of: a condition and a configuration, or assistance information. The method 600 may include, at 604, performing the proactive measurement in the discontinuous reception active state according to the at least one of the condition and the configuration or the assistance information. The proactive measurement may be used to maintain a quality of a radio link in the discontinuous reception active state.

The method illustrated in FIG. 6 may include one or more additional aspects described below or elsewhere herein. In some embodiments, the performing at 604 may include performing the proactive measurement more frequently than allowed by the discontinuous reception active state. In some embodiments, the receiving at 602 may include receiving the condition in signaling including at least one of: a beam or cell measurement parameter of a radio bearer, or a quality of service parameter of the radio bearer. In some embodiments, the receiving at 602 may include receiving the configuration in signaling including at least one of: a beam failure indication evaluation, or an out-of-sync evaluation.

In some embodiments, the performing at 604 may include determining that the condition is satisfied, and applying the configuration based on the condition. In some embodiments, the method 600 may further include transmitting, to a network node, information related to the proactive measurement. In some embodiments, the information may include at least one of: a duration of a recovery of the radio link, a number of times the condition has been satisfied, or whether a radio problem is detected after the condition is satisfied. In some embodiments, the receiving at 602 may include receiving the assistance information where the assistance information includes at least one of: an expected duration of one or more recovery procedures of the radio link, or a likelihood of the one or more recovery procedures of the radio link occurring before a next discontinuous reception active time. In some embodiments, the one or more recovery procedures may include at least one of: a beam failure recovery, a cell re-selection, or a handover. In some embodiments, the method 600 may further include detecting a potential failure of the radio link, and initiating a recovery of the radio link. In some embodiments, the method 600 may include receiving downlink data based on completion of the recovery of the radio link.

In some embodiments, the receiving at 602 may include receiving the condition, where the condition includes at least one of: a reference signal received power associated with a serving cell, a reference signal received power associated with a serving beam, one or more quality of service requirements, an amount of time since downlink data was last received, or an amount of time since generation of the downlink data (e.g., an age of the last received downlink data which may include the time elapsed after the creation (e.g., a sample generation) of the data). In some embodiments, the receiving at 602 may include receiving the configuration where the configuration includes at least one of: a time based on a user equipment discontinuous reception timer for performing the proactive measurement, or a type of the proactive measurement. In some embodiments, the type may include at least one of: a beam failure indication evaluation or an out-of-sync evaluation.

As described above, FIG. 6 is provided as an example. Other examples are possible according to some embodiments.

FIG. 7 illustrates an example flow diagram of a method 700, according to some embodiments. For example, FIG. 7 may illustrate example operations of a network node (e.g., apparatus 10 illustrated in, and described with respect to, FIG. 4a). Some of the operations illustrated in FIG. 7 may be similar to some operations shown in, and described with respect to, FIGS. 1-5.

In an embodiment, the method 700 may include, at 702, determining, for a proactive measurement in a discontinuous reception active state, at least one of: a condition and a configuration, or assistance information. The method 700 may include, at 704, transmitting the at least one of the condition and the configuration or the assistance information. The proactive measurement may be used to maintain a quality of a radio link in the discontinuous reception active state.

The method illustrated in FIG. 7 may include one or more additional aspects described below or elsewhere herein. In some embodiments, the transmitting at 704 may include transmitting the condition in signaling including at least one of: a beam or cell measurement parameter of a radio bearer, or a quality of service parameter of the radio bearer. In some embodiments, the transmitting at 704 may include transmitting the configuration in signaling including at least one of: a beam failure indication evaluation, or an out-of-sync evaluation.

In some embodiments, the method 700 may further include receiving information related to the proactive measurement. In some embodiments, the receiving may include receiving the information where the information includes at least one of: a duration of a recovery of the radio link, a number of times the condition has been satisfied, or whether a radio problem is detected after the condition is satisfied. In some embodiments, the transmitting at 704 may include transmitting the assistance information where the assistance information includes at least one of: an expected duration of one or more recovery procedures of the radio link, or a likelihood of the one or more recovery procedures of the radio link occurring before a next discontinuous reception active time. In some embodiments, the one or more recovery procedures may include at least one of: a beam failure recovery, a cell re-selection, or a handover.

In some embodiments, the transmitting at 704 may include transmitting the condition where the condition includes at least one of: a reference signal received power associated with a serving beam, a reference signal received power associated with a serving cell, one or more quality of service requirements, an amount of time since downlink data was last received, or an amount of time since generation of the downlink data. In some embodiments, the transmitting at 704 may include transmitting the configuration where the configuration includes at least one of: a time based on a user equipment discontinuous reception timer for performing the proactive measurement, or a type of the proactive measurement. In some embodiments, the type may include at least one of: a beam failure indication evaluation or an out-of-sync evaluation.

As described above, FIG. 7 is provided as an example. Other examples are possible according to some embodiments.

Figure 8B:
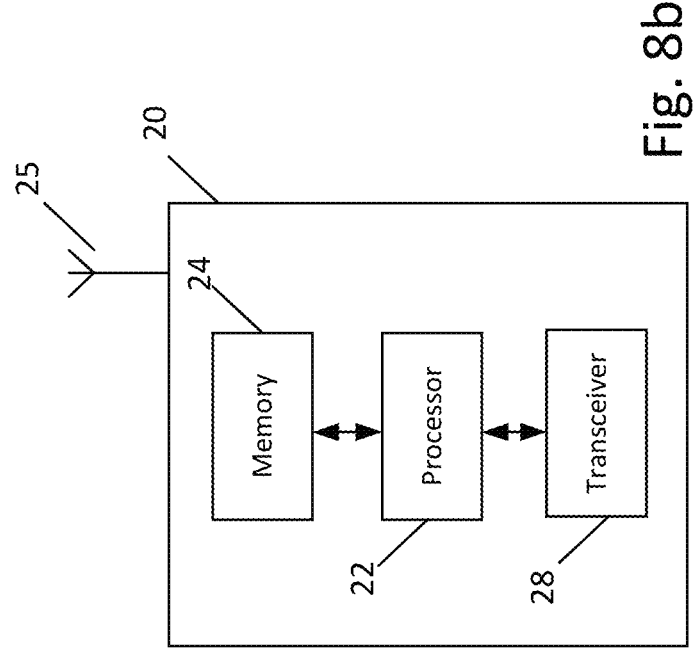
FIG. 8b illustrates an example block diagram of an apparatus, according to another embodiment.
Figure 8A:
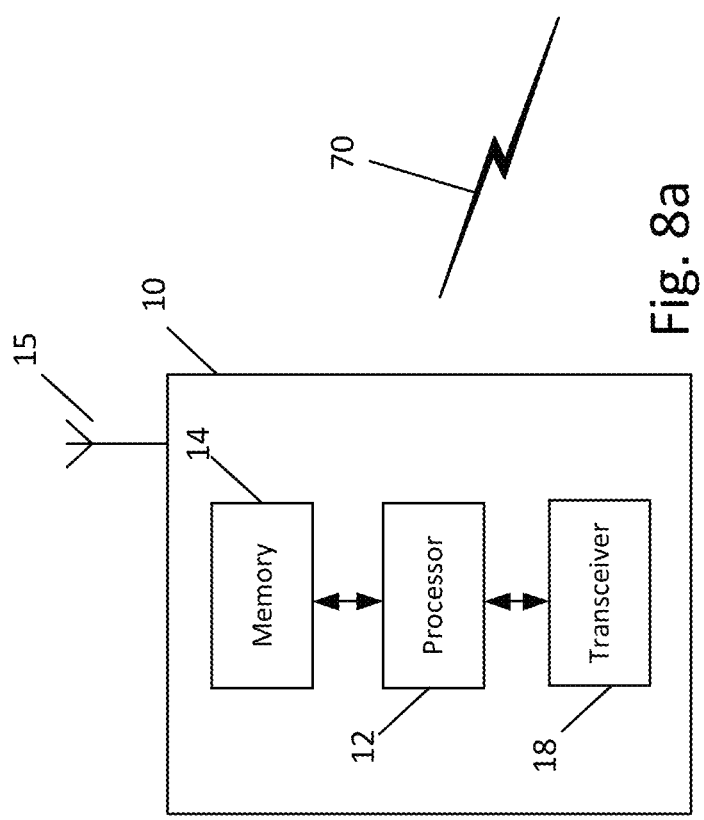
FIG. 8a illustrates an example block diagram of an apparatus, according to an embodiment.

FIG. 8a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-5 and 7. For instance, apparatus 10 may be controlled by memory 14 and processor 12 to perform the method of FIG. 7.

FIG. 8b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8b.

As illustrated in the example of FIG. 8b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-6. For instance, in one embodiment, apparatus 20 may be controlled by memory 24 and processor 22 to perform the method of FIG. 6.

In some embodiments, an apparatus (e.g., apparatus 10 and/or apparatus 20) may include means for performing a method or any of the variants discussed herein, e.g., a method described with reference to FIG. 6 or 7. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is reducing or eliminating lost packets by performing proactive problem detection with respect to a beam. In addition, another example benefit of some example embodiments is maintenance of energy-saving operations of a UE while performing a more robust problem detection procedures. Accordingly, the use of some example embodiments results in improved functioning of communications networks and their nodes and, therefore constitute an improvement at least to the technological field of beam recovery, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

3GPP Third Generation Partnership Project
BFD Beam Failure Detection
BFI Beam Failure Indication
BFR Beam Failure Recovery
BS Base Station
CSI Channel State Information
DCI Downlink Control Information
DRX Discontinuous Reception
MAC Medium Access Control
NR New Radio
OoS Out of Synch
PDCCH Physical Downlink Control Channel
PDSCH Physical Downlink Shared Channel
PER Packet Error Rate
PUCCH Physical Uplink Control Channel
QCI QoS Class Indication
QoS Quality of Service
RA Random Access
RAN Radio Access Network
RLF Radio Link Failure
RLM Radio Link Monitoring
RNTI Radio Network Temporary Identifier
RRC Radio Resource Control
RS Reference Signal
RSRP Reference Signal Received Power
RSRQ Reference Signal Received Quality
SON Self Organizing Networks
SSB Synchronization Signal Block
UE User Equipment
WUS Wake Up Signal

We claim:

1. An apparatus, comprising:
   at least one processor; and
   at least one memory including computer program code,
   wherein the at least one memory and the computer program code are configured to, with the at least one processor, cause the apparatus at least to:
   receive, for a proactive measurement in a discontinuous reception active state:
   a condition and a configuration, and
   assistance information, wherein the assistance information comprises a likelihood of one or more recovery procedures of the radio link occurring before a next discontinuous reception active time, wherein the one or more recovery procedures comprise at least one of:
   a beam failure recovery,
   a cell re-selection, or
   a handover; and
   perform the proactive measurement in the discontinuous reception active state according to at least one of the condition and the configuration or the assistance information, wherein the proactive measurement is used to maintain a quality of a radio link in the discontinuous reception active state.

2. The apparatus according to claim 1, wherein the at least one memory and the computer program code are configured to, with the at least one processor, further cause the apparatus, when performing the proactive measurement, at least to:

perform the proactive measurement more frequently than allowed by the discontinuous reception active state.

3. The apparatus according to claim 1, wherein the at least one memory and the computer program code are configured to, with the at least one processor, further cause the apparatus, when receiving the condition and the configuration, at least to:
receive the condition in signaling comprising at least one of:
a beam or cell measurement parameter of a radio bearer, or
a quality of service parameter of the radio bearer.

4. The apparatus according to claim 1, wherein the at least one memory and the computer program code are configured to, with the at least one processor, further cause the apparatus, when receiving the condition and the configuration, at least to:
receive the configuration in signaling comprising at least one of:
a beam failure indication evaluation, or
an out-of-sync evaluation.

5. The apparatus according to claim 1, wherein the at least one memory and the computer program code are configured to, with the at least one processor, further cause the apparatus, when performing the proactive measurement, at least to:
determine that the condition is satisfied; and
apply the configuration based on the condition.

6. The apparatus according to claim 1, wherein the at least one memory and the computer program code are configured to, with the at least one processor, further cause the apparatus at least to:
transmit, to a network node, information related to the proactive measurement.

7. The apparatus according to claim 6, wherein the at least one memory and the computer program code are configured to, with the at least one processor, when transmitting the information, at least to:
transmit the information, wherein the information comprises at least one of:
a duration of a recovery of the radio link,
a number of times the condition has been satisfied, or
whether a radio problem is detected after the condition is satisfied.

8. The apparatus according to claim 1, wherein the at least one memory and the computer program code are configured to, with the at least one processor, further cause the apparatus, when receiving the assistance information, at least to:
receive the assistance information, wherein the assistance information further comprises
an expected duration of the one or more recovery procedures of the radio link.

9. The apparatus according to claim 1, wherein the at least one memory and the computer program code are configured to, with the at least one processor, further cause the apparatus at least to:
detect a potential failure of the radio link; and
initiate a recovery of the radio link.

10. The apparatus according to claim 1, wherein the at least one memory and the computer program code are configured to, with the at least one processor, further cause the apparatus, when receiving the condition and the configuration, at least to:
receive the condition, wherein the condition comprises at least one of:
a reference signal received power associated with a serving cell,
a reference signal received power associated with a serving beam,
one or more quality of service requirements,
an amount of time since downlink data was last received, or
an amount of time since generation of the downlink data.

11. The apparatus according to claim 1, wherein the at least one memory and the computer program code are configured to, with the at least one processor, further cause the apparatus, when receiving the condition and the configuration, at least to:
receive the configuration, wherein the configuration comprises at least one of:
a time based on a user equipment discontinuous reception timer for performing the proactive measurement, or
a type of the proactive measurement, wherein the type comprises at least one of: a beam failure indication evaluation or an out-of-sync evaluation.

12. An apparatus, comprising:
at least one processor; and
at least one memory including computer program code,
wherein the at least one memory and the computer program code are configured to, with the at least one processor, cause the apparatus at least to:
determine, for a proactive measurement in a discontinuous reception active state:
a condition and a configuration, and
assistance information, wherein the assistance information comprises a likelihood of one or more recovery procedures of the radio link occurring before a next discontinuous reception active time, wherein the one or more recovery procedures comprise at least one of:
a beam failure recovery,
a cell re-selection, or
a handover; and
transmit at least one of the condition and the configuration or the assistance information,
wherein the proactive measurement is used to maintain a quality of a radio link in the discontinuous reception active state.

13. The apparatus according to claim 12, wherein the at least one memory and the computer program code are configured to, with the at least one processor, further cause the apparatus, when transmitting the condition and the configuration, at least to:
transmit the condition in signaling comprising at least one of:
a beam or cell measurement parameter of a radio bearer, or
a quality of service parameter of the radio bearer.

14. The apparatus according to claim 12, wherein the at least one memory and the computer program code are configured to, with the at least one processor, further cause the apparatus, when transmitting the condition and the configuration, at least to:
transmit the configuration in signaling comprising at least one of:
a beam failure indication evaluation, or
an out-of-sync evaluation.

15. The apparatus according to claim 12, wherein the at least one memory and the computer program code are configured to, with the at least one processor, further cause the apparatus at least to:
receive, from a user equipment, information related to the proactive measurement.

16. The apparatus according to claim 15, wherein the at least one memory and the computer program code are configured to, with the at least one processor, further cause the apparatus, when receiving the information, at least to:
receive the information, wherein the information comprises at least one of:
a duration of a recovery of the radio link,
a number of times the condition has been satisfied, or
whether a radio problem is detected after the condition is satisfied.

17. The apparatus according to claim 12, wherein the at least one memory and the computer program code are configured to, with the at least one processor, further cause the apparatus, when transmitting the assistance information, at least to:
transmit the assistance information, wherein the assistance information further comprises
an expected duration of the one or more recovery procedures of the radio link.

18. The apparatus according to claim 12, wherein the at least one memory and the computer program code are configured to, with the at least one processor, further cause the apparatus, when transmitting the condition and the configuration, at least to:
transmit the condition, wherein the condition comprises at least one of:
a reference signal received power associated with a serving cell,
a reference signal received power associated with a serving beam,
one or more quality of service requirements,
an amount of time since downlink data was last received, or
an amount of time since generation of the downlink data.

19. The apparatus according to claim 12, wherein the at least one memory and the computer program code are configured to, with the at least one processor, further cause the apparatus, when transmitting the condition and the configuration, at least to:
transmit the configuration, wherein the configuration comprises at least one of:
a time based on a user equipment discontinuous reception timer for performing the proactive measurement, or
a type of the proactive measurement, wherein the type comprises at least one of: a beam failure indication evaluation or an out-of-sync evaluation.

20. An method, comprising:
receiving, by a user equipment for a proactive measurement in a discontinuous reception active state:
a condition and a configuration, and
assistance information, wherein the assistance information comprises a likelihood of one or more recovery procedures of the radio link occurring before a next discontinuous reception active time, wherein the one or more recovery procedures comprise at least one of:
a beam failure recovery,
a cell re-selection, or
a handover; and
performing the proactive measurement in the discontinuous reception active state according to at least one of the condition and the configuration or the assistance information, wherein the proactive measurement is used to maintain a quality of a radio link in the discontinuous reception active state.

* * * * *